United States Patent [19]

Brockmann et al.

[11] 4,368,913
[45] Jan. 18, 1983

[54] INDUSTRIAL ROBOT HAVING A GRIPPING DEVICE

[75] Inventors: Karl-Heinz Brockmann, Langensohl; Karl P. Mölder, Gonbach; Gerd Wauer, Kaiserslautern, all of Fed. Rep. of Germany

[73] Assignee: Pfaff Industriemaschinenfabrik GmbH, Fed. Rep. of Germany

[21] Appl. No.: 182,802

[22] Filed: Aug. 29, 1980

[30] Foreign Application Priority Data

Sep. 13, 1979 [DE] Fed. Rep. of Germany ....... 2937061

[51] Int. Cl.³ .............................................. B66C 1/00
[52] U.S. Cl. .................................. 294/106; 294/86 R
[58] Field of Search ............... 294/106, 115, 119, 118, 294/104, 85, 82.22, 86 R

[56] References Cited

U.S. PATENT DOCUMENTS 2,857,193 10/1958 Heppenstall ......................... 294/106
3,698,757 10/1972 Smith ................................... 294/106

Primary Examiner—James B. Marbert
Attorney, Agent, or Firm—McGlew and Tuttle

[57] ABSTRACT

An industrial robot gripping device for gripping workpieces which have opposite contoured faces comprise gripping jaws which are contained by a parallel linkage which have faces which engage on the respective faces of the workpiece from opposite sides and are of a mere image configuration so that the engagement is complete. The parallel linkages include a coupler link at one end of the linkage which carries the respective clamping jaw and a flap interconnecting two parallel crank arms at their opposite end parts and also connecting two guide rod members which are pivoted at spaced locations to the housing so that they may move parallel to each other. The outer crank arms of each linkage include an extending portion which terminates in a bearing pin which is engaged in a curved slot which is defined symmetrically on each side of the housing. The bearing pins are driven by the driving mechanism such as an air cylinder to cause them to move in the curve slot and transmit the motion to the parallel linkage and also two connecting rods to a central pin which moves along a slot which is defined in a symmetrical line of the housing.

8 Claims, 1 Drawing Figure

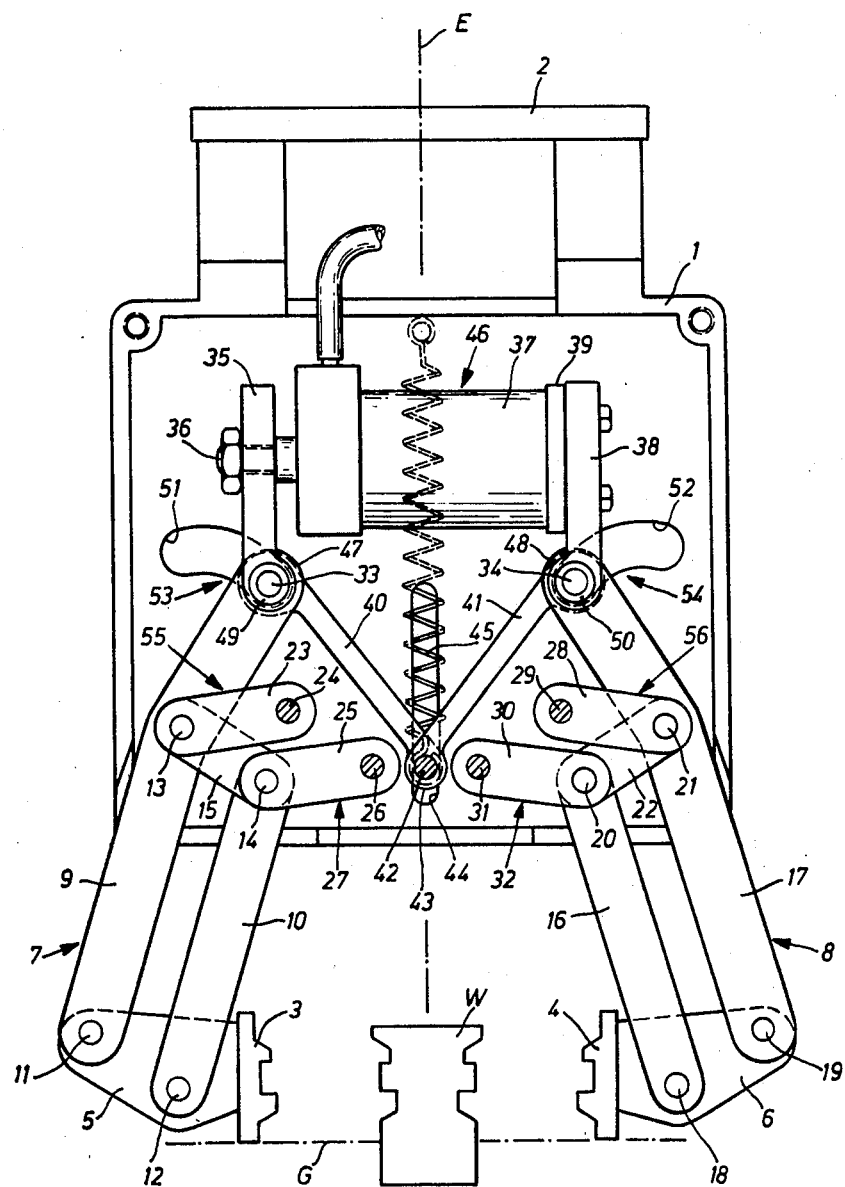

INDUSTRIAL ROBOT HAVING A GRIPPING DEVICE

FIELD AND BACKGROUND OF THE INVENTION

The invention relates in general to construction of industrial robots and in particular to a new and useful robot having a gripping device for gripping workpieces having particularly contoured engagement faces.

For gripping and clamping irregularly shaped workpieces with a fissured gripping surface geometry are used gripping devices with two exchangable molded jaws adapted to the shape of the workpiece. In order to prevent the form-locking gripping jaws from getting stuck at projecting or deeply recessed points of the workpieces during the opening and closing of the gripping device, the gripping jaws must always move parallel to each other over the entire gripping range. If the workpieces must be gripped and deposited without changing their position, the gripping jaws must also move uniformly toward and away from each other on a straight line extending perpendicularly to the plane of symmetry of the gripping device.

The Proceedings, issued on the occasion of the 8th International Symposium on Industrial Robots from 5/30–6/1/78 Stuttgart, show in vol. 1, p. 464, FIG. 6 a gripping device which is displaceably mounted on a guide rail secured on the housing of the gripping device and extending perpendicularly to its plane of symmetry. The fingers are displaced in opposite directions by means of two toggle lever gears so that the gripping jaws move in a straight line toward and away from each other parallel and in a constant distance from the housing of the gripping device. This gripping device, however, has the great disadvantage that it required much space, even with a relatively small gripping range, due to the use of a straight guide rail.

From DOS No. 2 257 609 is known a gripping device with two gripping jaws, where each gripping jaw is arranged on the coupler of a parallel crank gear and one crank each of the parallel crank gear is connected with a common driving mechanism for moving the gripping jaws in opposite directions. The parallel crank gears also permit a space saving design of the housing of the gripping device, even with a wide gripping range. But the couplers and gripping jaws, which are always parallel to each other, move on a curved track, their distance from the housing varying in dependence on their distance from each other. This gripping device can therefore, not receive and deposit the workpieces to be handled without displacement.

SUMMARY OF THE INVENTION

The object of the invention is to provide an industrial robot where the gripping device requires little space and the gripping jaws move parallel to each other in opposite directions on a straight line extending perpendicularly to the plane of symmetry of the gripping device.

In accordance with the invention an industrial robot is provided which has a housing and two gripping jaws arranged on the coupler of a parallel crank gear wherein one of the cranks of the parallel crank gear is connected with the driving mechanism serving to jointly move the gripping jaws in opposite directions. A differential gearing is assigned to each parallel crank gear. The differential gear comprises two guide rods carrying the parallel crank gear and a guide mechanism controlling its relative position to the housing in dependence on the pivoted position of the cranks.

The fact that the parallel crank gears are arranged, not as in the past on the housing of the gripping device, but on guide rods of the differential gear arranged in pairs, and that the relative position of the guide rods is controlled by means of the guide mechanisms in dependence on the pivoted position of the cranks of the parallel crank gears, makes it possible to flatten the path of motion of the couplers of the parallel crank gear carrying the gripping jaw, and thus the path of motion of the gripping jaw, to a straight line. In this way the advantages which could only be achieved separately heretofore, namely compact design and straight-parallel movement of the gripping jaws, are combined for the first time in a gripping device. The extent of the compensating or correcting movements to be performed by the guide mechanisms the guide rods depends on longitudinal dimensions of the various gear parts and on the intervals of the fulcrums and can be determined either graphically or mathematically.

A particularly advantageous correlation between guide rods and parallel crank gears consists in that the guide rods of each differential gear, which are arranged in pairs, form a part of a four-bar linkage whose coupler also serves as a web for the corresponding parallel crank gear.

According to another feature, each guide mechanism comprises at least one curved section secured on the housing, and a guide member cooperating with it and arranged on one of the two cranks of the respective parallel crank gear. With a corresponding accurate shape of the curved section, exact straight guidance of the couplers of the parallel crank gears, and thus of the gripping jaws is thus achieved over the entire gripping range. For s smaller gripping range, the guide mechanisms could also be equipped, instead of with curved sections and guide members, with a guide rod which is articulated, at one end, on the housing, and at the other end on one of the cranks of the parallel crank gears.

In order to synchronize the opposite movements of the gripping jaws during the opening and closing of the gripping device, the cranks of the parallel crank gears connected with the driving mechanism are connected with each other by two connecting rods, which are arranged, at one end, on the joints between the driving mechanism and the cranks of the parallel crank gears and, at the other end, in a common joint whose joint pin slides in a guide slot provided in the plane of symmetry of the gripping device.

In accordance with the invention there is provided a clamping device for use with an industrial robot which includes the housing carrying parallel linkages arranged on respective sides of a line of symmetry and which include coupler links at their one end carrying respective clamping jaws having contours comparable to the respective side face of the workpiece to be engaged therebetween and which also includes means for guiding the movement of the parallel linkage by engagement of a bearing pin of a linkage member in a particularly contoured slot which is arranged symmetrically in the housing.

A further object of the invention is to provide a clamping device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic partial elevation and partial sectional view of a clamping device constructed in accordance with the invention.

DESCRIPTION OF THE PREFERRED EMBODIMENT

Referring to the drawing, in particular the invention embodied therein comprises an industrial robot gripping device for gripping workpieces W which has opposite contoured faces using clamping jaws 3,4 which have faces and which are mirror image to the contours of the workpiece W.

The gripping device has a housing 1 which is provided with a fastening flange 2 for connection to an arm (not shown) of an industrial robot. For the form-locked gripping and clamping of a workpiece W, the gripping device has two gripping jaws 3 and 4 whose gripping surface represents a negative image of the respective opposite surfaces of workpiece W.

Gripping jaws 3, and 4 are detachably mounted on respective couplers 5 and 6 of a parallel crank gear or linkage 7 or 8. The parallel crank linkage 7 contains two cranks 9 and 10, which are connected with the coupler 5 by means of respective joint pins 11 and 12. The cranks 9 and 10 are connected by means respective joint pins 13 and 14 with a flap 15, which forms the web of the parallel crank linkage 7. The parallel crank linkage 8 contains two cranks 16 and 17 which are connected with the coupler 6 by means of respective joint pins 18 and 19. Cranks 16 and 17 are connected by means of respective joint pins 20 and 21 with a flap 22 which forms the web of the parallel crank linkage 8.

On joint pin 13 is arranged one end of a guide rod 23, whose other end is mounted on a joint pin 24 secured on housing 1. On joint pin 14 is arranged in the same manner one end of a guide rod 25 whose other end is mounted on a joint pin 26 secured on housing 1. Guide rods 23, 25 bearing on housing 1 carry thus cranks 9 and 10 and thus also the entire parallel crank linkage 7. Since guide rods 23 and 25 are pivotally mounted on respective joint pins 24 and 26, the web of the parallel crank linkage 7 formed by flap 15 can be moved relative to housing 1. Guide rods 23 and 25 are a part of four-bar linkage 27, whose web forms housing 1 and whose coupler forms flap 15. The flap 15 is both a linkage element of four-bar linkage 27 and of parallel crank linkage 7. On the joint pin 21 is arranged one end of a guide rod 28 whose other end is mounted on a joint pin 29 secured on housing 1. On joint pin 20 is arranged in the same manner one end of a guide rod 30, whose other end is mounted on a joint pin 31 secured on housing 1. Guide rods 28 and 30 bearing on housing 1 thus carry cranks 16 and 17 and thus also the entire crank linkage 8, and the web formed by flap 22, as well as the web of parallel crank linkage 7 are movable relative to housing 1. Guide rods 28 and 30 are a part of a four-bar linkage 32 whose web forms housing 1 and whose coupler forms flap 22. Flap 22 is thus both an element of four-bar linkage 32 and of parallel crank linkage 8.

Cranks 9 and 17 are extended beyond flaps 15 and 22 and carry at their end a respective joint pin 33 and 34. On joint pin 33 is arranged a supporting plate 35 which is rigidly connected with piston rod 36 of a single-action compressed air cylinder 37. On joint pin 34 is arranged a supporting plate 38 which is screwed directly on the housing 39 of compressed air cylinder 37. Compressed air cylinder 37 is carried exclusively by carrier plates 35 and 38 and is thus movable relative to the housing 1.

On joint pins 33 and 34 is arranged one end of a respective connecting rod 40 and 41. The respective other end of connecting rods 40 and 41 is mounted on a common joint pin 42 of a joint 43, with joint pin 42 gliding in a guide slot 44 of housing 1 provided in the plany of symmetry E of the gripping device. On joint pin 42 is arranged one end of a tension spring 45 whose other end is secured on housing 1. Connecting rods 40 and 41 transmit, the force of the tension spring 45 to joint pins 33 and 34 and also have together with guide slot 44 the affect that the joint pin 33 always has the same distance from the plane of symmetry E as the joint pin 34, and that cranks 9 and 10 and 16 and 17 always assume a mirror-image position with regard to the plane of symmetry E. The compressed air cylinder 37, the tension spring 45, and the connecting rods 40 and 41 form a driving mechanism 46 for the joint and opposite movement of the gripping jaws 3 and 4. The joints comprising joint pins 33 and 34 between driving mechanism 46 and cranks 9 and 17 are designated with 47 and 48.

On joint pins 33 and 34 of joints 47 and 48 are mounted respective rotatable rollers 49 and 50. Each of the rollers 49 and 50 is guided in a respective curved groove 51 and 52 provided in housing 1. Roller 49 and groove 51 form a guide mechanism 53, while roller 50 and groove 52 form a guide mechanism 54. Guide rods 23 and 25 and guide mechanism 53 form a differential gear 55 assigned to parallel crank linkage 7, while guide rods 28 and 30 and guide mechanism 54 form a differential gear 56 assigned to parallel linkage gear 8.

The gripping device works as follows:

In the open position of the gripping device, compressed air cylinder 37 is admitted with compressed air, so that is exerts a force on carrier plate 35,38 to move them toward each other. Cranks 9 and 17 and thus parallel crank gears 7 and 8 are thus held in the pivotal position represented in the drawing againt the force of tension spring 45, and rollers 49 and 50 bear on the inner ends of grooves 51 and 52.

As soon as the gripping device is in the position necessary for gripping a workpiece W, compressed air cylinder 37 is evacuated, after which tension spring 45 moves joints 47 and 48 apart by respective connecting rods 40 and 41 and turns cranks 9 and 17 in opposite directions in such a way that gripping jaws 3 and 4 move uniformly toward each other. Parallel crank gears 7 and 8 have the effect that gripping jaws 3 and 4 maintain their mutual parallel alignment during this movement.

When cranks 9 and 17 are turned, rollers 49 and 50 are displaced inside grooves 51, and 52 so that joints 47 and 48 move on a track corresponding to the shape of the grooves 51 and 52. The components of this curved movement of joints 47 and 48 parallel to the plane of symmetry E results in a pivotal movement of guide rods 23 and 25 and 28 and 30 and thus in an oppositely directed relative movement flaps 15 and 22 relative to housing 1. Since flaps 15 and 22 form the web of parallel crank gears 7 and 8, the relative movement of flaps 15 and 22 is superposed on the pivotal movement of cranks 9 and 10 and 16 and 17. The shape of grooves 51 and 52 is determined graphically or mathematically so that the relative movement of flaps 15 and 22 effected by them corrects the movement of parallel crank linkages 7 and 8 in such a way that the couplers 5 and 6 and thus gripping jaws 3 and 4 move along a straight line which extends perpendicularly to the plane of symmetry E.

After the gripping device is closed, workpiece W is held force and form-locking by the action of tension 45, and by the form closure of gripping jaws 3 and 4.

For opening the gripping device, compressed air cylinder 37 is admitted with compressed air, so that joints 47 and 48 move toward each other against the force of tension spring 45, and parallel crank linkage 7 and 8 turn into the position shown in the drawing. Since rollers 39 and 50 are also displaced inside grooves 51, and 52 and grooves 51 and 52 produce accordingly again a relative movement of flaps 15 and 22; the gripping jaws 3 and 4 move during the opening on the same straight path of motion as in closing. This way workpiece W is received and deposited again without jamming, canting or displacement.

In this embodiment, the guide rods 23 and 25 and 28 and 30 are arranged in pairs and are of equal length and extend parallel to each other, so the four-bar linkages 27 and 32 are designed as parallel crank gears. This special form of the four-bar linkage however, is not absolutely necessary for the operation of the gripping device. Four-bar linkages 27,32 of differential gears 55 and 56 could also have guide rods of different length arranged in an angle to each other. In this case only the shape of the grooves would have to be adapted to the different path of motion of the couplers of the four-bar linkage, to obtain again a straight path of motion of the gripping jaws 3 and 4.

While a specific embodiment of the invention has been shown and described in detail to illustrate the application of the principles of the invention, it will be understood that the invention may be embodied otherwise without departing from such principles.

What is claimed is:

1. An industrial robot gripping device for gripping workpieces having opposite contoured faces, comprising a housing, first and second parallel linkages arranged symmetrically on said housing, each including a respective first and second coupler link, each coupler link carrying a respective clamping part with a face of a configuration comparable to a respective contour face of the workpiece, said first and second parallel linkages also including first and second outer and inner crank links parallel to each other and articulated at their one ends to said coupler links and having opposite parts, said first and second linkages also including guide rod members pivoted on said housing and having opposite ends pivoted to said opposite parts of said first and second outer and inner crank links and also include first and second connecting flaps interconnecting said outer ends of said guide rod members at their articulation to said first and second outer and inner crank links, said outer crank links having extending portions extending beyond said connecting flaps and having outer ends with a joint pin, a guide groove in said housing symmetrically arranged on each side of said housing into which a respective joint is confined for movement, a central elongated slot defined in said housing between said guide grooves, a return pin movable in said slot, spring means urging said pin in a return direction, first and second connecting rods extending between said return pin and said joint pin, and drive means to move said joint pin in said groove to move said first and second parallel linkages and to thereby move said clamping jaws toward and away from a workpiece positioned therebetween.

2. An industrial robot according to claim 1, wherein said guide grooves comprises a curved groove defined in said housing equally spaced on each side of a line of symmetry of said housing.

3. An industrial robot according to claim 1, wherein said guide grooves includes at least one curved section and wherein there is a separate crank connected to each return pin.

4. An industrial robot according to claim 2, wherein said joint pins comprise rotatable bearing bushings.

5. An industrial robot according to claim 1, wherein said spring means comprises a tension spring connected to said joint pin and having an opposite end connected to said housing.

6. An industrial robot gripping device for gripping workpieces, comprising a housing, first and second guide rod members pivoted on said housing adjacent their one ends and having opposite ends, first and second parallel linkages pivoted to the respective opposite ends of said guide rod members, each of said parallel linkages having a crank arm member with a crank arm portion extending outwardly from said linkage, a crank arm pin on the outer ends of each of said crank arm members, said housing defining a guide rod for each of said crank arm pins on said housing, each of said linkages including a couple link portion carrying a respective clamping part, said linkages guiding said clamping part through substantially parallel paths toward a workpiece for engagement of the workpiece, a guide pin mounted on said housing for movement backwardly and forwardly along a confined path, connecting rod means connected from said guide pin to first and second crank arm portions of said first and second linkages and drive means for driving said pin in a direction to engage a workpiece and for facilitating the return of said linkages to disengage from a workpiece.

7. An industrial robot gripping device according to claim 6, wherein said drive means includes a member to drive said pin in a direction to close to said jaws on a workpiece and spring return means acting on said drive pin to move it in an opposite direction to move said jaws away from the workpiece.

8. An industrial robot gripping device, comprising a housing, first and second gripping jaws articulated to said housing, a parallel crank gear having a coupler connected to said jaws, a driving mechanism connected to said parallel crank gear serving to jointly move said gripping jaws in respective opposite directions, a differential gear (55,56) assigned to each parallel crank gear (7,8) said differential gear including two guide rods (23,25; 28,30) carrying the parallel crank gear (7 or 8) and a guide mechanism (53,54) controlling its relative position to said housing (1) in dependence on the pivoted position of said cranks (9,10; 16,17), said parallel crank gear comprising first and second parallel linkages each having a crank arm portion extendion outwardly from said linkage and terinating in a guide pin, said guide mechanism including a guide roll for each parallel linkage in which a respective pin is confined, a joint pin centrally disposed betweeen said guide pins of said parallel linkages, said housing having a joint pin guide slot in which said joint pin is confined and return spring means acting on said joint pin to return it to a non-active position and drive means connected to said joint pin to drive said joint pin to actuate said parallel linkages to cause said gripping jaws to grip an object.

* * * * *